United States Patent
Ames

[15] 3,707,718
[45] Dec. 26, 1972

[54] RADAR SYSTEM
[72] Inventor: Stephen A. Ames, Owing Mills, Md.
[73] Assignee: Westinghouse Electric Corporation, Pittsburgh, Pa.
[22] Filed: Feb. 18, 1969
[21] Appl. No.: 800,140

[52] U.S. Cl.....................................343/7.7
[51] Int. Cl.................................G01s 9/42
[58] Field of Search.........................343/7.7

[56] References Cited
UNITED STATES PATENTS

| | | | |
|---|---|---|---|
| 3,072,857 | 1/1963 | Thaler | 343/8 X |
| 3,209,354 | 9/1965 | Stull, Jr. | 343/7.7 |
| 3,267,468 | 8/1966 | Stull, Jr. | 343/7.7 |
| 3,341,847 | 9/1967 | Fried et al. | 343/7.7 X |
| 3,404,399 | 10/1968 | Eschner, Jr. | 343/7.7 |
| 3,465,336 | 9/1969 | Fishbein et al. | 343/7.7 |

*Primary Examiner*—Malcolm F. Hubler
*Attorney*—F. H. Henson, E. P. Klipfel and J. L. Wiegreffe

[57] ABSTRACT

There is disclosed a pulse-doppler, moving-target, airborne, radar with a plurality of range-gating channels and a novel clutter tracker for suppressing, from the intelligence correlated to obtain range and velocity, the clutter reflected from ground. The clutter is suppressed by filters and the frequency of the clutter is maintained within the notch of the filters by an AFC. The mixer of this AFC which sets this notch frequency is driven from an oscillator whose frequency is set in dependence upon the frequency of the clutter signal without confusion (centroiding) from large target signals near in frequency to the clutter signal. The clutter signal is isolated from the confusing target signals by reliance on the phenomenon that the clutter alone passes through most of the range channels and may be detected by a gate which responds to the simultaneous passage of signals through this plurality of range channels.

6 Claims, 6 Drawing Figures

RADAR SYSTEM

BACKGROUND OF THE INVENTION

This invention relates to radar systems and has particular relationship to pulse-doppler moving-target radar. In this application this invention is disclosed particularly with reference to an airborne radar of this type but to the extent that this invention is applicable to radar of other types, for example, shipborne radar or even fixed radar, such application is within the scope of this application.

The teachings of the prior art as to radar and related technology with which this invention concerns itself appears in the following reference documents.

D. J. Povejsil, R. S. Raven, P. Waterman — Airborne Radar — A book published by P. Van Nostrand Co. — 1961.

Palarad Electronics Corp. — Spectrum Analyzer Techniques Handbook — 1962.

J. I. Marcum — A statistical Theory of Target Detection by Pulsed Radar — RAND Research Memo RM— 754 — Dec. 1, 1947.

Pulse-doppler, moving-target, multiple-range radar includes a transmitter which transmits, into a region under observation, pulses or trains of coherent ratio-frequency waves at predetermined intervals; the intervals are different for successive series of pulses. These pulses are reflected by the objects in the region. Each of these objects changes the frequency of the reflected wave trains in dependence upon the velocity of the object and the radar platform relative to each other as governed by the Doppler principle. The reflected pulses are evaluated by a receiver, the velocity of each object relative to the radar platform being determined from the doppler-shift frequency; that is, the deviation of the frequency of the reflected train from the transmitted train, and the range being determined by correlating the phases of the wave trains transmitted at different intervening intervals.

The objects from which the pulses are reflected include objects moving relative to ground in the region of observation, which are herein called targets, and the ground encompassing the region of observation. In this application the signals reflected from targets are called target signals and the signals reflected from ground are called clutter signals. Clutter signals are of particular interest in airborne radar where the craft carrying the radar, the radar platform, is flying in such a direction that the clutter is reflected from land masses. It is necessary that the clutter signals be suppressed with a minimum deterioration in the effectiveness of the radar in detecting targets and it is an aim of this invention to achieve this desideration.

The receiver of a pulse-doppler, moving-target radar includes a plurality of range channels, each of which is essentially a separate receiver or sub-receiver. Each channel includes a range gate which is normally closed. The gates are opened in succession during sub-intervals of the interval between transmitted pulses. The instants of opening of the gates correspond to different ranges from the radar platform. A signal received through a gate is received at the range from the platform corresponding to the instant when the gate is opened and is processed in the gate channel of the gate through which is passes. Typically, there may be as many as 50 to 200 range channels and the gates may be open successively for a duration of a microsecond at intervals of a fraction of a microsecond between gates.

The multiplicity of range channels are used to reduce the time necessary to evaluate signal patterns picked up by the radar. Radars without the range channels are available but they require repeated resetting of the range parameters to determine the physical parameters of the targets in a region under observation and evaluation of the targets consumes so much time that the target pattern changes materially before the evaluation is complete.

In accordance with the teachings of the prior art, both the single-range-channel and the multi-range-channel radar receivers include clutter-signal rejection filters. In the single-channel receiver the filter is set to absorb a signal within a range of frequencies corresponding to the anticipated ground-speed of the craft. This range must be limited to avoid suppressing targets whose doppler-shift frequency is near the shift-frequency of the clutter. To prevent the clutter signal from shifting out of the absorption or notch range of the filter as the clutter frequency varies with changes in the speed or attitude of the craft or like changes, the receiver includes an AFC loop which maintains the clutter signal within the notch frequency range of the clutter-signal rejection filter.

In the multi-range channel receivers a clutter-signal rejection filter is included in each range channel and AFC loop to maintain the clutter signal within the rejection-notch frequency range which is associated with each loop. Alternatively, a single AFC loop, locked to one range channel, may be provided. In this case, separate mixers are provided for each of the channels and these mixers are driven by the voltage-controlled oscillator (called here VCO), whose frequency is controlled by distributing the output of this oscillator to the separate mixers.

This prior-art apparatus does not operate satisfactorily. The clutter is not effectively eliminated, particularly where large targets are present; in fact, at times targets rather than the clutter are eliminated. It is an object of this invention to overcome this deficiency of prior-art, pulse-doppler, moving-target radar particularly of the multi-range-channel type.

SUMMARY OF THE INVENTION

This invention results from the realization that the prior-art radar suffers from the centroiding problem. It has been realized that where a large target signal is near the frequency range of the clutter, the AFC loop or loops of the receiver lock in, not on the clutter, but between the clutter and the large target signal. The displacement of the lock-in frequency of the loop depends on the relative magnitudes of the clutter and target signals and may be high for large target signals. This phenomenon is called centroiding or major centroiding (as distinct from minor centroiding by reason of lag in electrical component operation) and where it occurs the clutter signal is passed by the range channels to the correlating and evaluating apparatus and target signals are suppressed or a large clutter rejection band is required.

This invention arises from the discovery that, unlike target signals, the clutter signal in a multi-range-channel receiver is not confined to a single channel but appears in a substantial number of the channels. This occurs because the clutter comes from a land mass whose parts are at a wide range of distances from the radar platform. The signals received from the different distances flow through different range channels and are present in these channels.

In accordance with this invention, the frequency of the voltage-controlled oscillator is set, or regulated, by isolating the actual clutter signal by reliance on its property of appearing in a substantial number, and not one or a few, of the range channels and deriving an error signal for regulating the frequency of the voltage-controlled oscillator from this isolated clutter signal.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIGS. 4a, b, c, d, e, f are graphs showing the relationship between target signals and the clutter signal in the practice of this invention;

FIGS. 6a, b, c, show the apparent change in spectral width and shift in center frequency which occur due to the frequency domain to time domain conversion in the detected output of a swept IF filter for a narrow band signal input.

DESCRIPTION OF THE PREFERRED EMBODIMENT

Figure 1:
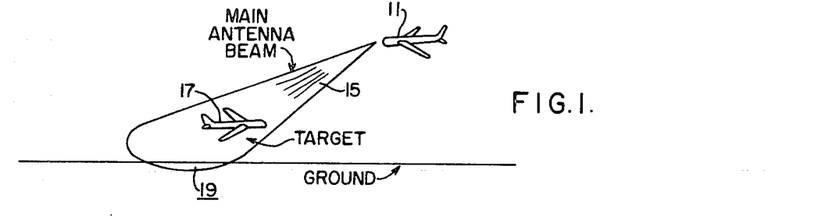
FIG. 1 is a diagrammatic pictorial view showing the relationship between an aircraft serving as a platform for a radar in accordance with this invention and one of the targets of the radar and ground.

FIG. 1 shows an aircraft 11 which carries a radar in accordance with this invention and serves as radar platform. The radar has an antenna 13 (FIG. 2) which transmits pulses of radio-frequency waves into the region of observation and receives pulses reflected from objects in the region. This antenna has a main beam 15 which is essentially derived by plotting the half-power attenuation as a function of angle of transmission. The antenna also has side lobes but the effects of these is so small that they do not require consideration.

The transmitted pulses impinge on a target 17 and on the ground 19 and pulses are reflected from these objects. The target or targets reflect target signals and the ground reflects clutter signals.

Figure 2:
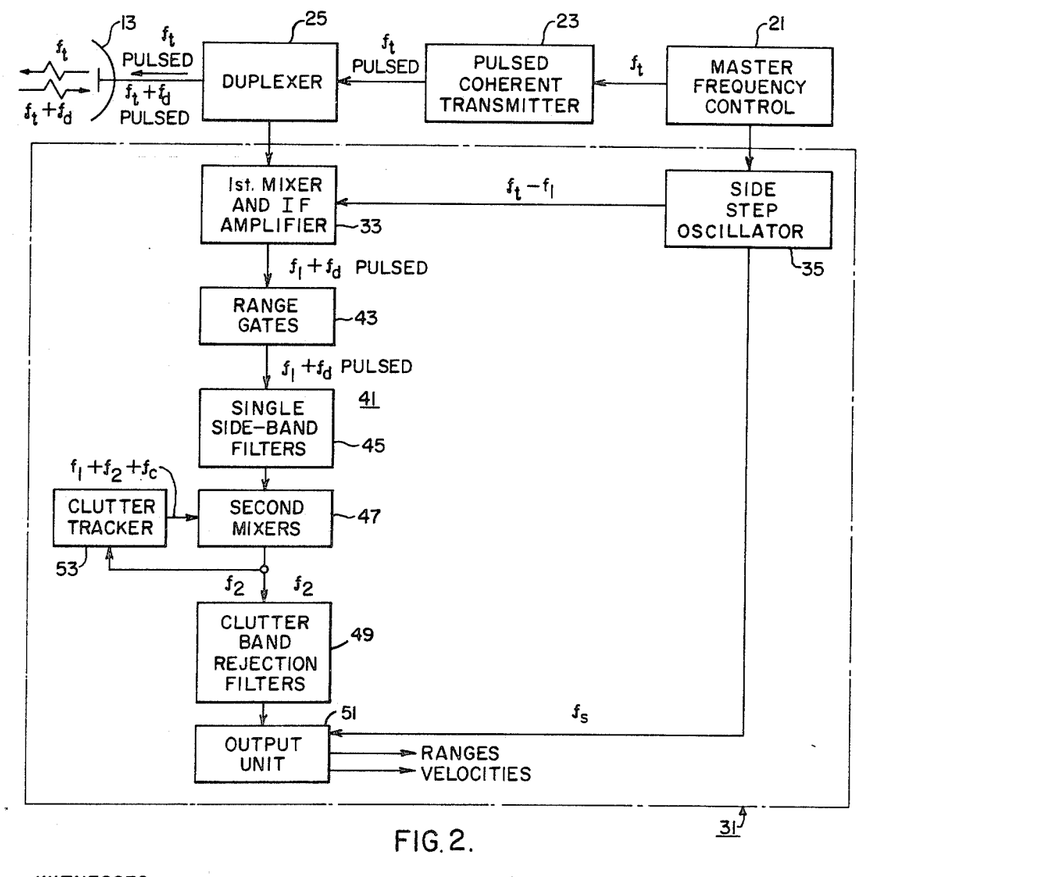
FIG. 2 is a block diagram showing a radar in accordance with this invention.
Figure 3:
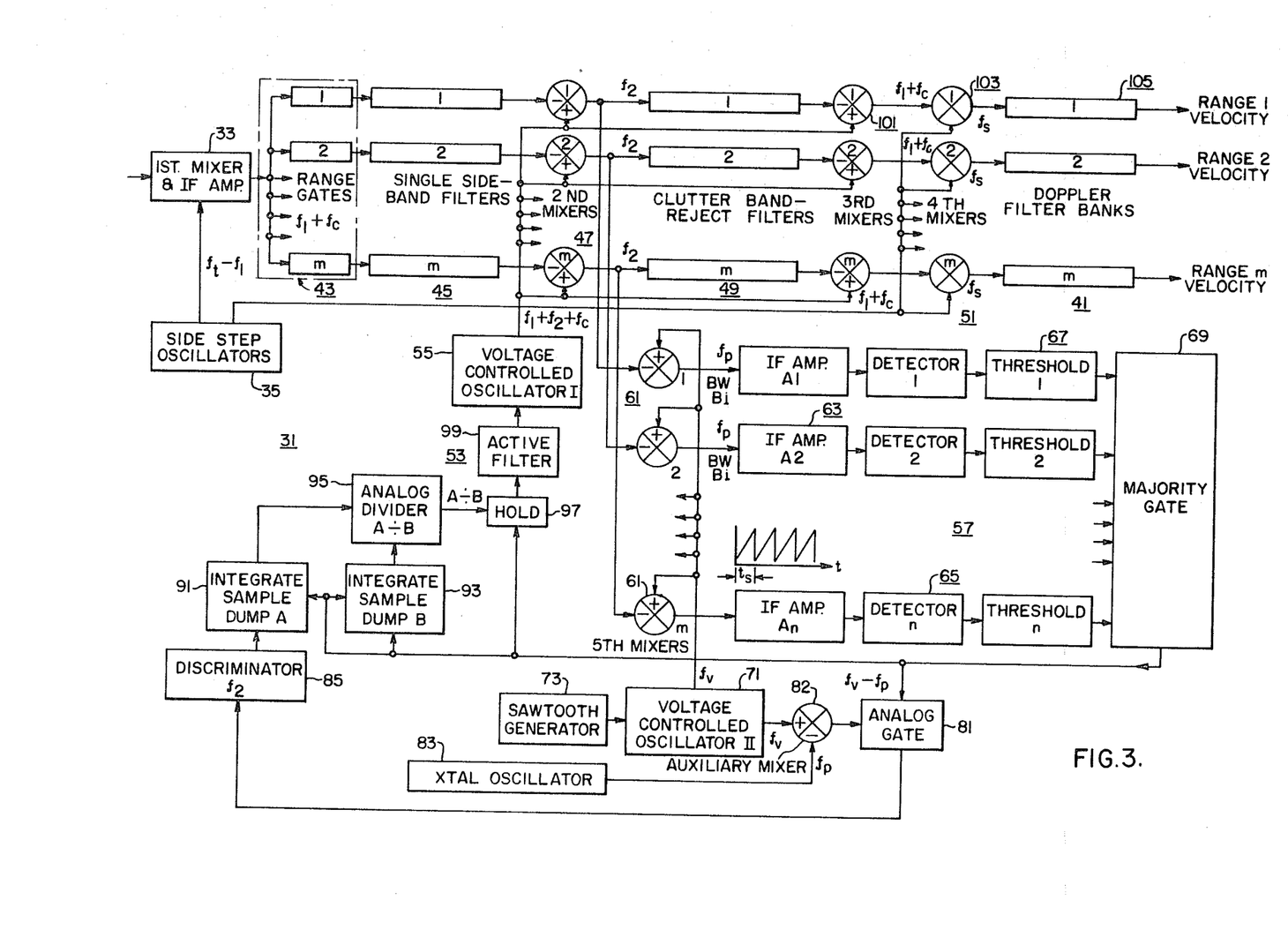
FIG. 3 is a block diagram showing in detail a receiver according to this invention.

The apparatus shown in FIGS. 2 and 3 is a radar including a master-frequency control 21 which controls the frequency of the different waves and wave-trains used in the radar. The master-frequency control passes a radio-frequency wave having frequency $f_t$ to a pulsed coherent transmitter 23 which passes pulsed coherent wave trains of frequency $f_t$ to the antenna 13 through a duplexer 25. The antenna 13 transmits the wave train signals of frequency $f_t$.

The pulses are reflected from the objects in the region under observation. The reflected pulses have frequencies modified in accordance with the relative velocities of the objects reflecting the pulses and have frequencies $f_t + f_d$ where $f_d$ is the doppler-shift frequencies and depends on the relative velocity of each target 17 or ground 19 and the platform 11. Since the gain pattern of the antenna extends on opposite sides of the flight path the relative velocities to the individual targets 17 with respect to the platform will give rise to a wide spectrum of frequencies the center frequency of which may be here identified as $f_c$.

The received signal is transmitted through the duplexer 25 to receiver 31. The receiver 31 includes a mixer and intermediate-frequency (IF) amplifier 33. There are a number of mixers in the radar and these are designated herein as first, second, third and so. The mixer 33 is driven by side-step oscillator 35 which supply a frequency $f_s - f_1$ to the mixer 33 and the output of the IF amplifier is a pulsed signal of center frequency $f_1$.

These IF pulses are passed through a range-channel unit 41 which includes a plurality of range channels identified as 1 through m each essentially constituting a small receiver. The range channel unit 41 includes range gates 43, single side-band filters 45, 2nd mixers 47, clutter-band rejection filters 49, and output units 51 by which the derived signals are correlated.

The receiver 31 includes a clutter tracker 53 which responds to the clutter signal that appears in not less than a plurality of the gating channels 41 to maintain the derived frequency of the clutter signal within the frequency band centered at $f_2$ of the clutter-band rejection filter 49 so that this signal is highly attenuated in the output.

The range gates 43 are normally closed and they are successively opened for short intervals at sub-intervals of the interval between the transmitted pulses. These sub-intervals correspond to successive ranges from the radar platform 11. During each of these sub-intervals target signals and/or clutter from targets or ground at the range corresponding to the opening of a gate are received through the gates 43 and pass through the corresponding channel 41. The clutter signal received from 1st mixer and IF amplifier 33 is at a frequency $f_1 + f_c$. The range gates are essentially wide-band amplifiers which pass the square-wave pulses received. The signals admitted through the range gates 43 are respectively transmitted through the signal side-band filters 45 and are converted into continuous waves including the target frequencies and $f_c$.

Typical spectra at the outputs of the single side-band filters 45 of the channels 1, 2 and m are shown in FIG. 4a. In these graphs magnitude is plotted vertically and frequency horizontally. The filters 45 have a bandwidth $f_r$ and the spectra extend from $f_1 - (f_r/2)$ to $f_1 + (f_r/2)$. The target signals are shown hatched and the clutter filled in. While the targets appear at different frequencies in the three channels, the clutter, since it depends only on the velocity of the platform 11, appears at the same frequency but in all three ranges, since the range of clutter is extensive.

The signals from the single side-band filters 45 are transmitted through the second mixers 47 to the respective clutter band rejection filters 49. The second mixers are driven by voltage-controlled oscillator I 55 of the clutter tracker 53 which supplies a controlled frequency $f_1 + f_2 + f_c$ and converts the clutter signals to a frequency centered at $f_2$, the notch frequency center of the rejection filters 49.

The clutter tracker 53 controls VCO I 55 so that centroiding is suppressed.

The clutter tracker 53 includes in addition to VCO I 55 (FIG. 3) a plurality of channels 57 identified 1 through n where n may be different from m. Each channel includes a fifth mixer 61, an IF amplifier 63, a detector 65, and a threshold component 67. The thresholds 67 each pass a signal on when it is above a predetermined magnitude to a majority gate 69. The gate 69 opens only it if receives simultaneously signals from a predetermined plurality of the thresholds 67 and does not open if it receives signals from substantially less than this plurality. The plurality may be all n thresholds 67 or less than n.

Each of the mixers 61 is connected to a corresponding second mixer 47 and receives the signal of frequency $f_2$ from the connected mixers 47. These mixers 61 are driven in common from voltage-controlled oscillator II 71. The frequency determining component of VCO II 71 is swept by a sawtooth generator 73 at periods of duration $t_s$ and during this period its frequency varies linearly over the range of frequencies which appear at the outputs of second mixers 47. This range is the same as that over which the frequencies of the signals reflected from the objects in the region under observation extend, as shown in FIG. 4a.

Figure 4:
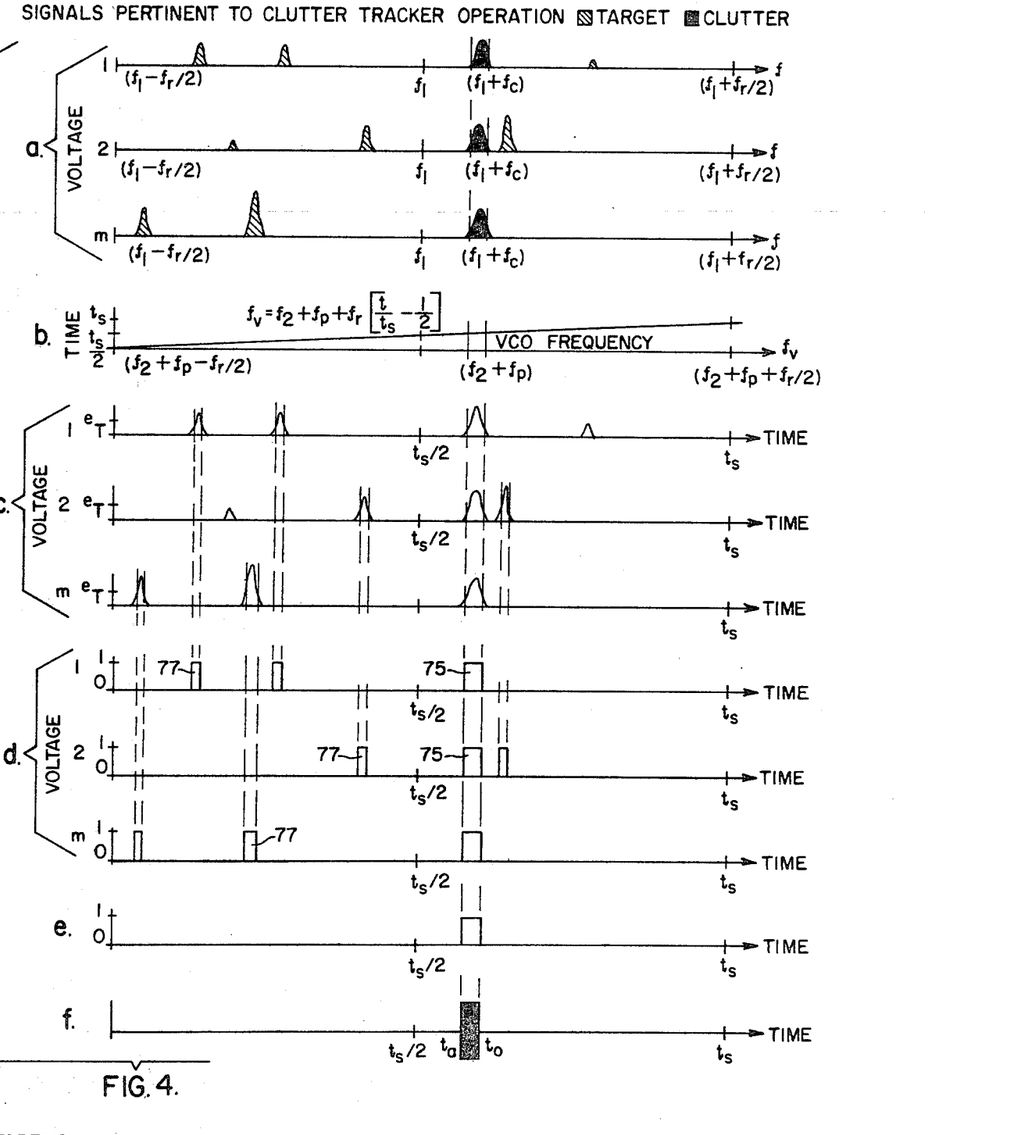

VCO II 71, the sawtooth generator 73 and the fifth mixer 61 function as a spectrum analyzer producing successive signals at the inputs of the successive IF amplifiers 63 respectively as the VCO II 71 sweeps through the signals of the corresponding frequencies at the outputs respective of second mixers 47. Since VCO II sweeps over the whole frequency range in an interval $t_s$, there is a one-to-one correspondence between each instant of a period $t_s$ and each frequency of the range from $f_1 - (f_r/2)$ to $f_1 + (f_r/2)$ (FIG. 4a). This correspondence is presented in FIG. 4. The bandwidth $B_i$ of the IF amplifier 63 may be assumed to be large compared to the reciprocal of the period $t_s$ (that is the frequency of the sweep) so that each spectral component that appears in the mixer 61 appears only momentarily in the IF amplifier 63. VCO II 71 sweeps over each component of frequency passed by a corresponding IF amplifier 63 in a small fraction of $t_s$.

The variable frequency at the output of VCO II 71 may be designated as $f_v$ $$f_v = f_2 + f_p + f_r \left(\frac{t}{t_s} - \frac{1}{2}\right)$$

$f_p$ being the center frequency of the pass band (IF) of the channels swept. $t$ being any instant in the period $t_s$. The sweep and its relationship to FIG. 4a is shown in FIG. 4b. As shown in FIGS. 4b, c, d, e, f,
$f_v = f_2 + f_p - (f_r/2)$ when $t = 0$, and
$f_v = f_2 + f_p + f_4$ when $t = t_s$
$f_v = f_2 + f_p$ when $t/t_s = 1/2$ When VCO II 71 sweeps through an output of a second mixer 47 which has a frequency corresponding to a target signal or a clutter signal a pulse appears at the output of the corresponding threshold component 67. This is shown in FIGS. 4c and 4d. FIG. 4c shows that output at detectors 65, 1, 2 and m and FIG. 4d shows the output at thresholds 67, 1, 2 and m.

Because of the wide range of clutter, the clutter signal 75 appears in a plurality of threshold outputs simultaneously. The target signals 77 appear at different times at different threshold outputs. The majority gate 69 then opens only for the clutter signals. The output of the majority gate 69 is shown in FIG. 4e.

The clutter tracker 53 includes an analog gate 81 which is supplied with the output of the majority gate 69. The analog gate 81 is also supplied from a mixer 82 driven from VCO II 71 and from a crystal oscillator 83. VCO II 71 supplies the variable frequency signal $f_v$ and oscillator 83 a signal of fixed frequency $f_p$. The resulting signal to the analog gate 81 is $f_v - f_p$. The analog gate 81 only has an output when it receives a pulse from the majority gate. During this pulse the output of the analog gate 81 has a frequency which is centered in the neighborhood of $f_2$; that is, $f_v - f_p = f_2 \pm f_a$ where $f_a$ is the deviation from $f_2$ caused by possible shift of the clutter signal frequency.

Figure 5:
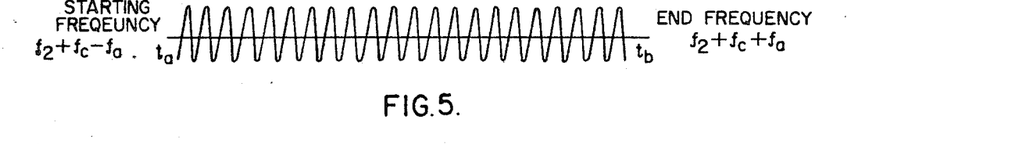
FIG. 5 is a graph showing on an expanded time scale the error signal which serves to control the voltage-control oscillator in the practice of this invention.

The output of the analog gate 81 is shown expanded in FIG. 5. This output is a square-wave modulated IF signal starting at $t_a$ and ending at $t_b$ and having a frequency which varies between $f_2 + f_c - f_a$ and $f_2 + f_c + f_a$. This frequency varies because the frequency of VCO II 71 progressively changes as it sweeps through the pulse duration.

The output of the analog gate 81 is supplied to a discriminator 85 which produces a pulse proportional to the deviation from $f_2$ of the center frequency of the signal from the analog gate. The output of the discriminator 85 serves to set an error signal for controlling VCO I 55. But it is necessary that this error signal be independent of the width of the clutter pulse and to achieve this purpose it is necessary that an appropriate signal independent of the clutter pulse be provided.

Let $e_d$ be the signal output of the discriminator 85. Then $e_d$ is a slant pulse which rises and falls to zero and has a heighth $$e_d = k_d f_r \left(\frac{t}{t_s} - \frac{1}{2}\right)$$

in the range $t_a < t < t_b$ of the sweep $t_s$; that is between $a$ and $b$. In this equation $k_d$ is the gain of the discriminator. Integrating the voltage over the pulse duration:

$$A = \int_{t_a}^{t_b} e_d d = \frac{k_d f_r}{2 t_s} [t_b^2 - t_a^2 - (t_b - t_a) t_s]$$

A contains the pulse width $t_b - t_a$ and this varies with the clutter level. To remove this deficiency integrate the output of the majority gate:

$$B = \int_{t_a}^{t_b} d = t_b - t_a$$

$$\frac{A}{B} = \frac{k_d f_r}{2 t_s} \frac{[(t_b - t_a)(t_b + t_a) - (t_b - t_a) t_s]}{t_b - t_a}$$

$$= \frac{k_d f_r}{2 t_s} [t_b + t_a - t_s]$$

$$= k_d f_r \left[\frac{t_b + t_a}{2 t_s} - \frac{1}{2}\right]$$

and this quantity depends only on $(t_b + t_a)/2$ or the center of the time that the majority gate 69 is open.

To take advantage of this feature the clutter tracker 53 includes integrators 91 and 93. Integrator 91 is supplied from discriminator 85 and integrator 93 from the majority gate 69. The clutter tracker 53 also includes an analog divider 95 which divides the quantity A by B. The quotient is supplied to a hold circuit 97 and provides an error signal to correct the frequency of VCO I 55. The error signal is supplied through a filter 99. The hold circuit 97 is supplied during each pulse and immediately thereafter the integrators 91 and 93 are dumped and prepared to receive a new error signal. The error is supplied continuously to VCO I 55 through the filter 99.

VCO I 55 supplies a signal having frequency centered at $f_1 + f_2 + f_c$ to the second mixers 47. This signal accurately corresponds to the frequency of the real clutter signal, and not to a centroided signal. This signal combined with the impressed signal $f_1 + f_c$ produces a signal $f_2$ which is centered in the clutter band-rejection filters 49. The outputs of the filters 49 pass through third mixers 101 where they are mixed with the output of VCO I 55 producing a signal $f_1 + f_c$ where $f_c$ is the residual clutter signal. The outputs of third mixers 101 are mixed in fourth mixers 103 with signal $f_s$ from side-step oscillators 35 producing the signals of the doppler shift frequencies. These signals are passed through the doppler filter banks 105 for the usual correlation. The doppler-shift frequencies determine the velocities of the targets at the various ranges.

Figure 6:
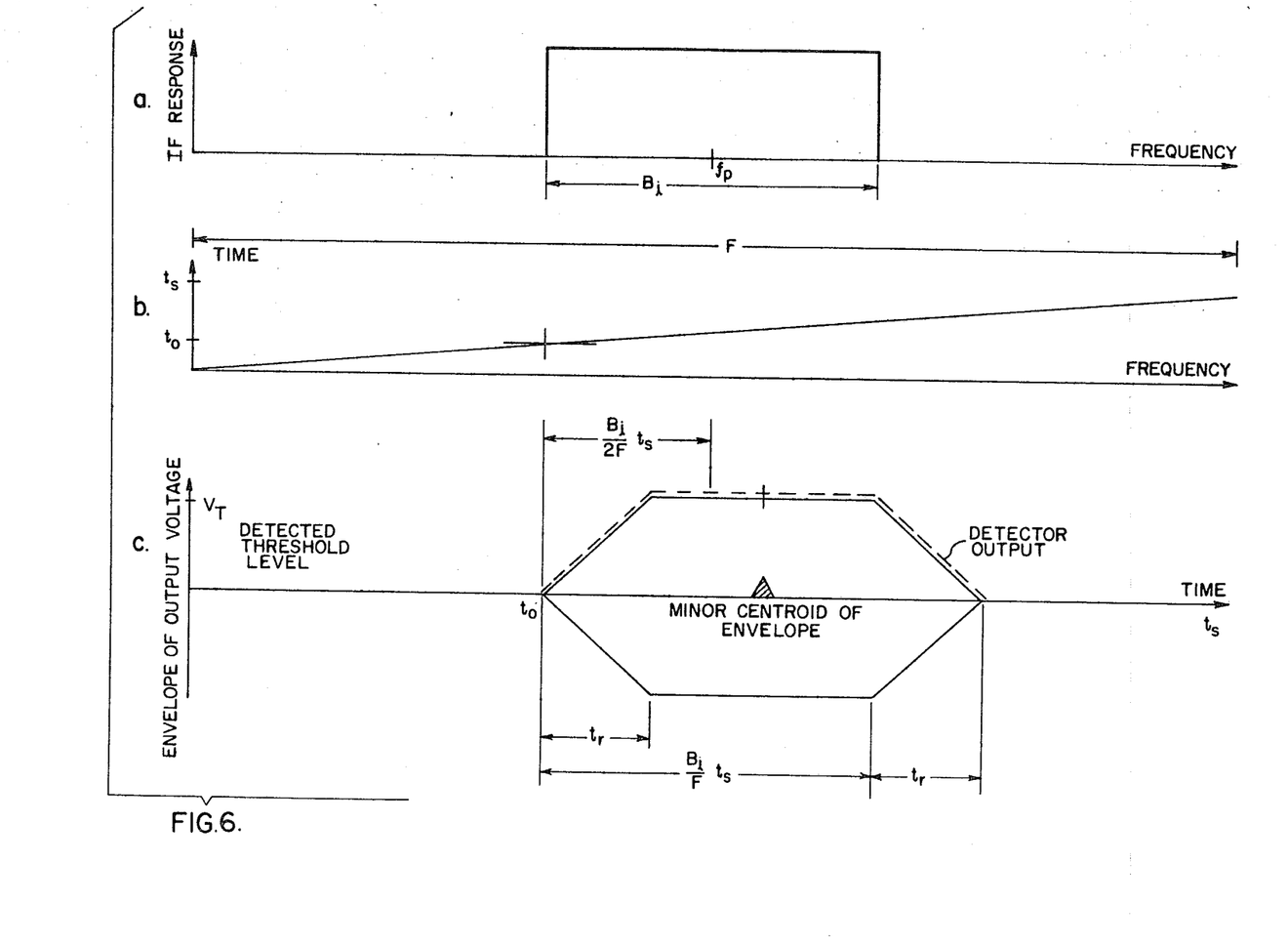

Another correction which may be desirably made arises from the shift or minor centroiding error introduced because the sweep of the spectrum analyzer through the clutter pulse has time lag. This is shown in FIGS. 6a, b, c. In all graphs time is plotted horizontally and amplitude vertically.

FIG. 6a corresponds to an idealized band-pass filter. This pulse has a center frequency $f_p$ and a bandwidth $B_t$. FIG. 6b shows the sweep of the analyzer and is similar to FIG. 4b. FIG. 6c shows the actual pulse produced at the output of the detectors 65. The output pulse builds up in a time interval $t_r$ and decays in a time interval $t_r$. $t_r$ is the time taken by a narrow band signal applied to the filter to rise from 10 percent to 90 percent maximum amplitude. The time to the center of the IF Sweep in FIG. 6a is $(B_t/2F) t_s$, where $F$ is the sweep range of VCO II 71 and the time to the start of the decay is $(B_t/F) t_2$. The center of the detector output is displaced by $t_r/2$ from the center of the IF sweep as shown in FIG. 6c. $B_t$ may be typically 525 Hz. In this case the minor centroiding error is about 117 Hz which can be corrected by shifting the oscillator VCO II 71 properly.

The following further elaboration is presented to aid those skilled in the art in practicing this invention.

The main beam clutter for down looking radars is generally so much larger than the required minimum detectable targets that the ultimate skirt rejection of the doppler filters 105 (FIG. 3) is not sufficient to obtain the desired sub-clutter visibility. To achieve the desired sub-clutter visibility it is usually necessary to pass the IF signal through a band rejection filter to attenuate the main beam clutter to a tolerable level. Sidelobe clutter is minimized by reducing the antenna sidelobes. The required width of the band-rejection filter is determined by the radar platform doppler and the width of the main beam clutter. The individual doppler filters 105 are matched to the target width which is approximately the reciprocal of the antenna dwell time on the targets. The main-beam clutter is wider than targets and can be expected to occupy several doppler filters for any velocity. However, when the radar platform velocity becomes so high that the required band-rejection filter width is several times the clutter width, steps must be taken to minimize the width of the "blind speed" band (equal to the width of the clutter notch) since this is a doppler region in which targets are not detectable.

The method generally employed for reducing the clutter filter width while compensating for changes in platform motion is to employ a "clutter tracker." The tracker is simply a narrow band AFC loop which follows the frequency variations in the main beam clutter thus keeping it centered at $f_2$, the center frequency of the discriminator of the AFC and band rejection filter. Since the AFC loop keeps the clutter centered in the band rejection filter as the radial velocity between radar platform 11 and clutter changes (due to change in airspeed or scanning of antenna), the clutter band rejection filter now need only be as wide as the constant velocity clutter width. The finite width is due to the finite antenna beam width. The tracker is physically inserted in place of the clutter band rejection filter of radar without a tracker. Targets emerge from the tracker unchanged in frequency. The effect of this substitution is to narrow the blind speed region.

The clutter tracker is an adaptation of the automatic-frequency control (AFC) loop commonly used in FM communications receivers to maintain the received carrier centered in the discriminator.

The successful operation of the clutter tracker discussed above is contingent on the existence of a large mainbeam-clutter-to-target ratio. The probability of large targets entering the discriminator can be reduced by restricting the bandwidth of the limiter since targets occupy a much wider doppler band than main-beam clutter. Nevertheless, large targets that appear in the limiter with main-beam clutter cause an error to be produced because target as well as ground give large signals in the clutter tracker. That is, the clutter tracker tends to track the amplitude weighted average frequency of two (or more) large signals thus failing to place the main beam clutter in the notch. This results in either detecting the clutter as a false target along with the desired target or causing the uncancelled clutter to overload the entire doppler filter bank thus blinding the radar to genuine targets.

A deficiency in single range-gated radar is the long time interval required to examine the entire radar range. Since a finite dwell time is required at each range position to allow for the doppler filters to build up, the required time to scan all range intervals sequentially may be unacceptably long especially for high-speed targets. When this is the case a "brute force" solution which allows simultaneous examination of all range intervals employs parallel, range gated doppler-filter banks 105 as shown in FIG. 3. Typical spectra of targets and clutter appearing following the single sideband filters 45 of the range channels 41 are shown in FIG. 4a. Only low sidelobe radar systems are considered. It is important to note that clutter appears in every range channel 41 at the same frequency whereas each target 17 (FIG. 1) appears in only one range channel at its particular doppler.

In the absence of targets the basic clutter tracker described above is used to remove clutter by inserting one in each range channel 41 in place of the clutter-band rejection filter 49 or using a single AFC loop locked to one channel and distributing the VCO to the mixers in the rest of the channels 41. The latter method saves duplicating the AFC loop in each range channel although the clutter filter is required in each. When large targets 17 are present as is the case in air-traffic control or certain military tactical situations, the clutter tracker suffers from the centroiding problem discussed previously. In the multiple range channel mechanization, the problem of large targets causing centroiding error can be eliminated in accordance with this invention.

The invention is the clutter-tracking system for use in a parallel-range channel (41) PD receiver 31 and is shown in block diagram form in FIG. 3. It is basically a sampled data AFC loop 53 with means for causing the tracker to be insensitive to all signals regardless of amplitude except those that appear in all (or at least a majority of) range channels 41 at the same frequency. The signal that occurs in all range channels 41 at the same frequency is uniquely main-beam clutter.

The operation of the clutter tracker may be understood from FIG. 4. The spectra in the first IF are shown in FIG. 4a. The targets 17 being non-range-extensive appear in a single range channel 41 and clutter which is range-extensive occupies all, or many of the $m$ range channels. The first IF signals are applied to the second mixers 47 which are driven by the loop VCO I 55. If the clutter tracker is functioning properly, the frequency of VCO I 55 is such that the clutter in the second IF 97 falls within the clutter band rejection filters 49 centered at $f_2$ where it is removed prior to the third and fourth conversions (these last two conversions can be combined in a single mixer instead of two, 101 and 103, and the order of conversion in no way affects the operation of the clutter tracker). The heart of the clutter tracker are the n swept receivers which are in effect spectrum analyzers. The number n of swept channels may be less than the number m of range channels 41. For ease of discussion and with reference to FIG. 4, the bandwidth $B_i$ of the $n$ IF amplifiers 63 is assumed to be very large and the reciprocal of the sweep time $t_s$ is assumed to be small. Thus when mixing the second IF signal with VCO II 71 which is swept with a sawtooth as shown in FIG. 4b, the detected waveforms of FIG. 4c appear at the inputs to the thresholds 67. It is not required to sweep VCO II 71 over a frequency range greater than the doppler of the radar platform 11. The thresholds' outputs (FIG. 4d) are applied to a majority gate (FIG. 4e) which controls an analog gate (FIG. 4f). The input to the analog gate is VCO II 71 mixed with a fixed oscillator to remove the offset frequency. Thus, the output of the auxiliary mixer 82 is the frequency of the second IF clutter signal which at that instant is converted to $f_p$ in the fifth mixers 61. As shown in FIG. 4, clutter has a finite spectral width causing the output from the analog gate 81 to be a chirped (linearly frequency modulated) pulse with length determined by the threshold level, the actual clutter width and $t_s$.

It is generally desirable to minimize the phase shift due to sampling to meet loop stability requirements. The phase shift can be minimized by making the sweep repetition frequency as high as possible. The upper limit is determined by the loss in sensitivity experienced due to the finite bandwidth IF filters 63. The problem now is to determine the maximum sweep rate and minimum IF bandwidth for given tracking accuracy and clutter characteristic. The clutter spectrum is swept through the IF filter 63 and thresholds 67. The output of the analog gate 81 at the mid-point of the gate pulse (FIG. 4f) is assumed to be the center of the clutter spectrum. This is slightly in error. This error however is a constant for a given sweep speed and IF bandwidth and can be adjusted out of the clutter tracker 53 by slightly offsetting the center frequency of the discriminator 85 or the crystal oscillator 83 producing $f_p$. Thus, high sweep rate does not introduce any intolerable tracking error.

Negligible loss in sensitivity results in a spectrum analyzer where $$[F/(t_s B_i^2)] \geq 1$$

A typical clutter tracker 53 has a bandwidth of 5 or 6 Hz. To maintain the additional phase shift introduced by the sampling to less than about 20° the sweep rate should be about 50 Hz, i.e. $t_s = 20$ milliseconds. For this sweep time and a typical clutter doppler range of 5.5 kHz, the allowable IF bandwidth is found $$B_i \geq \sqrt{F/t_s} = 525 \text{ Hz}$$

Using $B_i = 525$ Hz, the centroiding error due to the sweep speed can be approximated by:

$$f_\Sigma = (0.445F)/(2B_i t_s) = 117 \text{ Hz},$$

where $f_\Sigma$ is the frequency error, which can be calibrated out.

The output of the analog gate has a finite clutter-to-noise ratio, C/N which is effected by the number of channels 41 in the swept receiver 31, the minimum desired clutter level to be tracked, the decision threshold and the "majority" required for the gate 69. The output C/N is the ratio of the time the majority gate opens on clutter plus noise to the time it is opened due to noise alone. Another way of stating the C/N is the ratio of the probability of detecting clutter in the "-majority," $k$, out of a total of n swept channels 41 to the probability of exceeding the "majority" on noise alone. If the probability of exceeding the threshold on clutter plus noise in one swept channel is $pc$, the probability of exceeding the threshold on noise alone $pf$ and if the noise between channels is independent (but the clutter is the same in all channels), the probability of exceeding the threshold on clutter plus noise in $x$ of the $n$ channels is $$C_x^n pc^w (1-pc)^{n-x}$$

and the probability of exceeding the threshold on noise alone in $x$ of the $n$ thresholds is $C_x{}^n pf^w (1-pf)^{n-x}.$ Since exceeding any number of thresholds greater than k opens the majority gate, the C/N becomes $$C/N = \frac{\sum_{x=k}^{n} C_x{}^n\ pc^x(1-pc)^{n-x}}{\sum_{x=k}^{n} C_x{}^n\ pf^x(1-pf)^{n-x}}$$

No attempt is made to optimize C/N since that is a rather complex mathematical problem in itself depending on the desired minimum trackable C/N and the numbers $n$ and $k$. The probabilities pc and pf can be derived for a given C/N by reference to curves given by Marcum cited above.

The clutter tracking system, according to this invention, described above and shown in block diagram form in FIG. 3 is novel with respect to its ability to track main beam clutter in a spectral environment of multiple large targets without the centroiding problem characteristics of clutter trackers known in the prior art. The novel features of the invention include the use of the multiple swept receivers, majority gating of a swept oscillator 71 to produce a chirped pulse with average frequency of the main beam clutter converted to 2nd IF and the means for smoothing the variable width discriminated pulse prior to applying it to the loop filter.

I claim as my invention:

1. A pulsed-doppler moving-target radar system including means for transmitting pulses of RF signals to a region under observation, said region including, in addition to targets, which reflect target signals, the ground which reflects clutter signals, a receiver including a first mixer and an IF amplifier and a plurality of signal channels connected to the output of said amplifier each having a range gate through which said clutter signals and target signals are passed selectively into the respective channels during successive range-gate cycles, each of said channels also having connected in cascade with said respective range gates, wide bandpass filters, second mixers, clutter band rejection filters, doppler frequency output means, a clutter tracker unit having respective means connected to the outputs of each of the respective second mixers for maintaining the derived frequency band of the signals of the respective channels, including the doppler frequency, within the frequency band of said rejection filters, means for intermittently opening and closing said gates sequentially during sub-intervals of the time intervals between said R.F. pulses to thereby selectively separate target signals from the clutter on the basis of range and doppler frequency, a voltage controlled oscillator for supplying a sweeping heterodyne frequency to said second mixers and responsive to the clutter frequency in a plurality of said channels for maintaining the derived frequency of the clutter signal within the frequency band of said clutter rejection filters.

2. The system of claim 1 wherein the clutter tracker is not responsive to the passing of target signals by substantially less than the plurality of the gates.

3. The receiver of claim 1 wherein the clutter-tracking means includes a spectrum analyzer and also includes normally-closed gating means connected to receive the output of said analyzer, said gating means opening only responsive to the simultaneous passage by said analyzer of signals for at least a plurality of the range channels.

4. The pulsed-doppler moving-target radar system as set forth in claim 1 in which said clutter tracker unit includes a threshold circuit in each of said frequency deriving means and a majority gate responsive to a signal exceeding a threshold magnitude passed simultaneously by the majority of said mixers to determine the deviation, if any, of the clutter signal.

5. The receiver of claim 4 wherein said voltage-controlled oscillator is controlled by means including means for maintaining the control of the oscillator independent of the width, as a function of frequency, of the received clutter pulse.

6. The receiver of claim 4 wherein the controlling means includes means for deriving a controlling signal having a frequency corresponding to the center frequency of the clutter signal as it is received by said receiver, the oscillator being controlled by the deviation of the frequency of said controlled signal from the frequency corresponding to the maintained frequency.

* * * * *